US010075290B2

(12) United States Patent
Gorissen et al.

(10) Patent No.: US 10,075,290 B2
(45) Date of Patent: Sep. 11, 2018

(54) OPERATOR LIFTING IN CRYPTOGRAPHIC ALGORITHM

(71) Applicant: KONINKLIJKE PHILIPS N.V., Eindhoven (NL)

(72) Inventors: Paulus Mathias Hubertus Mechtildis Antonius Gorissen, Eindhoven (NL); Ludovicus Marinus Gerardus Maria Tolhuizen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 75 days.

(21) Appl. No.: 15/104,753

(22) PCT Filed: Dec. 17, 2014

(86) PCT No.: PCT/EP2014/078107
§ 371 (c)(1),
(2) Date: Jun. 15, 2016

(87) PCT Pub. No.: WO2015/091583
PCT Pub. Date: Jun. 25, 2015

(65) Prior Publication Data
US 2016/0315761 A1    Oct. 27, 2016

(30) Foreign Application Priority Data
Dec. 20, 2013 (EP) ..................... 13198943

(51) Int. Cl.
*H04K 1/00* (2006.01)
*H04L 9/00* (2006.01)
(Continued)

(52) U.S. Cl.
CPC .............. *H04L 9/008* (2013.01); *H03M 13/21* (2013.01); *H03M 13/23* (2013.01); *H04L 9/065* (2013.01);
(Continued)

(58) Field of Classification Search
CPC . H04L 2209/04; H04L 2209/16; H04L 9/008; H04L 9/0631; H04L 9/0618;
(Continued)

(56) References Cited

U.S. PATENT DOCUMENTS 3,849,760 A * 11/1974 Endou .................. G06K 9/4633
382/205
6,448,910 B1 * 9/2002 Lu .......................... H03M 13/23
341/107
(Continued)

FOREIGN PATENT DOCUMENTS

WO    2006058561 A1    6/2006

OTHER PUBLICATIONS

Castelluccia C et al: "Efficient Aggregation of encrypted data in Wireless Sensor Networks", Mobile and Ubiquitous Systems: Networking and Services, 2005. MOBIQUIT OUS 2005. The Second Annual International Conference on San Diego, CA, USA Jul. 17-21, 2005, Piscataway, NJ, USA,IEEE, Los Alamitos, CA, USA, Jul. 17, 2005 (Jul. 17, 2005), pp. 109-117, XP0.*

(Continued)

*Primary Examiner* — Jayesh M Jhaveri

(57) ABSTRACT

A system for performing an operation on data using obfuscated representations of the data is disclosed. Obtaining means are configured to obtain a first obfuscated representation of a first data value and obtain a second obfuscated representation of a second data value. A determining means 102 is configured to determine an obfuscated representation of a third data value, by performing the corresponding operations on the obfuscated representation of the first data value and the obfuscated representation of the second data value. Obfuscating means 101 may be configured to generate the first obfuscated representation based on the first data value and generate the second obfuscated representation based on the second data value. De-obfuscating means 103 may be configured to de-obfuscate the obfuscated representation of the third data value in order to obtain the third data value using a system of equations.

13 Claims, 2 Drawing Sheets

(51) Int. Cl.
*H04L 9/28* (2006.01)
*H04L 9/06* (2006.01)
*H03M 13/23* (2006.01)
*H03M 13/21* (2006.01)

(52) U.S. Cl.
CPC .......... *H04L 9/0618* (2013.01); *H04L 9/0631* (2013.01); *H04L 9/0637* (2013.01); *H04L 9/0656* (2013.01); *H04L 9/0662* (2013.01); *H04L 2209/04* (2013.01); *H04L 2209/16* (2013.01)

(58) Field of Classification Search
CPC ..... H04L 9/0637; H04L 9/065; H04L 9/0656; H04L 9/0662; H04L 9/00; H04L 9/28; H03M 13/21; H03M 13/23; H04K 1/00
See application file for complete search history.

(56) References Cited

U.S. PATENT DOCUMENTS

| | | | |
|---|---|---|---|
| 2006/0291650 A1* | 12/2006 | Ananth | H04L 9/065 380/46 |
| 2008/0208850 A1* | 8/2008 | Boyce | G06F 17/30985 |
| 2008/0235802 A1* | 9/2008 | Venkatesan | G06F 21/125 726/26 |
| 2011/0055591 A1* | 3/2011 | Rivain | H04L 9/003 713/189 |
| 2011/0066853 A1* | 3/2011 | Engels | H04L 9/3271 713/168 |
| 2011/0286596 A1* | 11/2011 | Gressel | H04L 9/0637 380/268 |
| 2012/0155638 A1 | 6/2012 | Farrugia et al. | |

OTHER PUBLICATIONS

Castellucia et al: "Efficient Aggregation of Encrypted Data in Wireless Sensor Networks"; Proceedings of the Second Annual International Conference on Mobile and Ubiquitous Systems:Networking and Services (MOBIQUITOUS'05), pp. 109-117.

Gentry: "Computing Arbitrary Functions of Encrypted Data"; Communications of the ACM, Mar. 2010, vol. 53, No. 3, pp. 97-105.

Trichina et al: "Simplified Adaptive Multiplicative Masking for AES"; Lecture Notes in Computer Science, vol. 2523, Jan. 2002, pp. 187-197.

* cited by examiner

OPERATOR LIFTING IN CRYPTOGRAPHIC ALGORITHM

CROSS-REFERENCE TO PRIOR APPLICATIONS

This application is the U.S. National Phase application under 35 U.S.C. § 371 of International Application No. PCT/EP2014/078107, filed on Dec. 17, 2014, which claims the benefit of European Patent Application No. 13198943.6, filed on Dec. 20, 2013. These applications are hereby incorporated by reference herein.

FIELD OF THE INVENTION

The invention relates to performing an operation using obfuscated representations of the operands.

BACKGROUND OF THE INVENTION

Nowadays, enormous amounts of data are transferred via networks, mobile phones, Bluetooth devices, bank automatic teller machines, and the like. In order to protect information from undesired accesses, encryption is very often used. In cryptographic, encryption is the process of encoding a message in such a way that third parts cannot read it, only authorized parts can. In an encryption scheme, the message, referred to as plaintext, is encrypted using an encryption algorithm, turning it into an unreadable ciphertext. This is usually done with the use of an encryption key, which specifies how the message is to be encoded. Any adversary that can see the ciphertext, should not be able to determine anything about the original message. An authorized party, however, is able to decode the ciphertext using a decryption algorithm, that usually requires a secret decryption key, that adversaries do not have access to.

Encryption can be applied also to protect stored data, such as files in computers and storage devices.

In cloud computing, distributed computing over a network is performed, usually involving a large number of computers connected over a real time network. The data involve in those computations need to be protected, as it is stored in a network wherein third parts can get easy access. In "Computing Arbitrary Functions of Encrypted Data" by Craig Gentry, Communications of the ACM, Vol. 53, No 3, Pages 97-105, March 2010, an encryption scheme keeping data private but allowing to perform operations, is disclosed. However, this encrypted scheme is computationally expensive.

Castelluccia C et al.; "Efficient Aggregation Of Encrypted Data In Wireless Sensor Networks", Mobile and Ubiquitous Systems: Networking and Services, 2005. MOBIQUITOUS 2005, 17 Jul. 2005, pages 109-117, XP010853989, ISBN: 978-0-7695-2375-0 discloses an additively homomorphic stream cipher.

WO 2006/058561 A1 discloses a cryptography function implemented on a SIM. A random mask is used to mask input data to the cryptographic function to be performed. In particular, the masking function is advantageously a group operation.

SUMMARY OF THE INVENTION

It would be advantageous to have a system that allows for performing an operation using encrypted representations of data values. To better address this concern, a first aspect of the invention provides a system for performing an operation over data using obfuscated representations of the data, comprising:

obtaining means configured to obtain a first obfuscated representation $(X_0, Y_0)$ of a first data value $w_0$ and obtain a second obfuscated representation $(X_1, Y_1)$ of a second data value $w_1$, wherein the following relations hold:

$$X_0 = A_0(w_0) \oplus B_0(\sigma_0)$$

$$Y_0 = A_1(w_0) \oplus B_1(\sigma_0)$$

$$X_1 = A_0(w_1) \oplus B_0(\sigma_1)$$

$$Y_1 = A_1(w_1) \oplus B_1(\sigma_1)$$

wherein
$\oplus$ is an operator,
$A_0, B_0, A_1$, and $B_1$ are linear operators, and an operator E that maps $(u, v)$ to $((u) \oplus B_0(v), A_1(u) \oplus B_1(v))$ is invertible with respect to u, and
$\sigma_0$ and $\sigma_1$ are state variables for providing redundancy to the obfuscated representations; and determining means configured to determine an obfuscated representation $(X_2, Y_2)$ of a third data value $w_2$, wherein $w_2 = w_0 \otimes w_1$, wherein $\otimes$ is an operator, by performing the following operations on the obfuscated representation $(X_0, Y_0)$ of the first data value $w_0$ and the obfuscated representation $(X_1, Y_1)$ of the second data value $w_1$:

$$X_2 = X_0 \oplus X_1$$

$$Y_2 = Y_0 \oplus Y_1.$$

This system has the advantage that an operation $\otimes$ between two input data values $w_0$ and $w_1$ can be performed using the obfuscated representation $(X_0, Y_0)$ of the input data value $w_0$ and the obfuscated representation $(X_1, Y_1)$ of the input data value $w_1$ without needing to decode the obfuscated representations. Moreover, the computational complexity of the operation is similar to the computational complexity of the operation $\oplus$. Consequently, the operation may be performed efficiently. Therefore, it is not necessary to de-obfuscate the obfuscated representations of $w_0$ and $w_1$ for performing an operation between them, improving in this way the security of the system without adding too much complexity.

For example, there may be domains W, Σ and Z defined such that $X_0, Y_0, X_1,$ and $Y_1$ are elements of Z; $w_0$ and $w_1$ are elements of W, and $\sigma_0$ and $\sigma_1$ are elements of Σ, and $A_0: W \times W \to Z$, $A_1: W \times W \to Z$, $B_0: \Sigma \times \Sigma \to Z$, $B_1: \Sigma \times \Sigma$. Operator $\oplus$ may be defined on Z, operator $\otimes$ may be defined on W, and an operator Δ may be defined on Σ. The operation $\oplus$ is commutative (that is, $z_1 \oplus z_2 = z_2 \oplus z_1$ for all $z_1, z_2 \in \Sigma$) and associative, that is, $(z_1 \oplus z_2) \oplus z_3 = z_1 \oplus (z_2 \oplus z_3)$ for all $z_1, z_2, z_3 \in \Sigma$. The mappings $A_0, A_1$ from W to Z may be such that for all $w_0, w_1 \in W$ and $i=0, 1$, $A_i(w_0 \otimes w_1) = A_i(w_0) \oplus A_i(w_1)$. This may be expressed by saying that $A_0$ and $A_1$ are linear. The mappings $B_0, B_1$ from Σ to Z may be such that for all $\sigma_0, \sigma_1 \in \Sigma$ and $i=0, 1$, $B_i(\sigma_0 \Delta \sigma_1) = B_i(\sigma_0) \oplus B_i(\sigma_1)$. We will express this by saying that $B_0$ and $B_1$ are linear. Moreover, $A_0, B_0, A_1,$ and $B_1$ are selected such that it is possible to uniquely determine $w \in W$ from the combination of $A_0(w) \oplus B_0(\sigma)$ and $A_1(w) \oplus B_1(\sigma)$. That is, if $w, w' \in W$ and $\sigma, \sigma' \in \Sigma$ are such that $A_i(w) \oplus B_i(\sigma) = A_i(w') \oplus B_i(\sigma')$ for $i=1, 2$, then $w = w'$.

The system may further comprise obfuscating means configured to generate the first obfuscated representation $(X_0, Y_0)$ based on the first data value $w_0$ and the second obfuscated representation $(X_1, Y_1)$ based on the second data value $w_1$.

The system may further comprise de-obfuscating means configured to de-obfuscate the obfuscated representation $(X_2, Y_2)$ of the third data value $w_2$ in order to obtain the third data value $w_2$ by from the system of equations:

$$X_2 = A_0(w_2) \oplus B_0(\sigma_2)$$

$$Y_2 = A_1(w_2) \oplus B_1(\sigma_2),$$

wherein $\sigma_2$ is a state variable for providing redundancy to the obfuscated representation $(X_2, Y_2)$ of the third data value $w_2$.

The system may further comprise a state generator for generating a value of the state variable $\sigma_0$ and/or a value of the state variable $\sigma_1$ randomly or pseudo-randomly, and wherein the obfuscating means is configured to generate the first obfuscated representation $(X_0, Y_0)$ based on the first data value $w_0$ and the state variable $\sigma_0$, and to generate the second obfuscated representation $(X_1, Y_1)$ based on the second data value $w_1$ and the state variable $\sigma_1$. This allows to create strong obfuscation by controlling the added redundancy imposed by the state variables $\sigma_0$ and/or $\sigma_1$.

The obfuscating means may be configured to look up the first obfuscated representation $(X_0, Y_0)$ and the second obfuscated representation $(X_1, Y_1)$ in a look-up table. Additionally or alternatively, the de-obfuscating means may be configured to look up the third data value $w_2$ in a look-up table. This is an efficient way of implementing the obfuscation. The implementation with look-up tables also makes it more difficult to break the obfuscation by an attacker.

The obfuscating means and the de-obfuscating means may be part of a first device, wherein the determining means are part of a second, different, device. The first device may further comprise a transmitting means and a receiving means, and the second device may further comprise a transmitting means and a receiving means. The transmitting means of the first device may be configured to transmit the first obfuscated representation $(X_0, Y_0)$ and the second obfuscated representation $(X_1, Y_1)$ to the receiving means of the second device. The transmitting means of the second device may be configured to transmit the obfuscated representation $(X_2, Y_2)$ to the receiving means of the first device. This configuration allows delegation of the $\otimes$ operation to the second device, without giving the second device access to the unobfuscated (or cleartext) data values $w_0$, $w_1$, and $w_2$.

The determining means may be configured to perform at least one of the computation of $X_2$ from $X_0$ and $X_1$ and the computation of $Y_2$ from $Y_0$ and $Y_1$ in the clear. This allows efficient computation of $X_2$ and $Y_2$, without needing to obfuscate the computation by itself, but still not revealing the original data values to an attacker.

The values of $w_0$, $w_1$, $w_2$, $\sigma_0$, $\sigma_1$, $\sigma_2$, $X_0$, $X_1$, $X_2$, $Y_0$, $Y_1$, and $Y_2$ may be values having a same number of bits. This facilitates the implementation.

The operators $A_0$, $B_0$, $A_1$, and $B_1$ may be invertible operators. This makes it easier to design the system parameters.

The operator $\oplus$ may be a bitwise XOR operation. This is a particularly suitable operation for this application. The bitwise XOR operation may be performed by means of at least one XOR machine instruction. This is an efficient way of computing the XOR operation, and does not reveal the original data values to an attacker.

In another aspect of the invention, a method for performing an operation on data using obfuscated representations of the data is provided. The method comprising the steps of:

obtaining a first obfuscated representation $(X_0, Y_0)$ of a first data value $w_0$ and obtaining a second obfuscated representation $(X_1, Y_1)$ of a second data value $w_1$, wherein the following relations hold:

$$X_0 = A_0(w_0) \oplus B_0(\sigma_0)$$

$$Y_0 = A_1(w_0) \oplus B_1(\sigma_0)$$

$$X_1 = A_0(w_1) \oplus B_0(\sigma_1)$$

$$Y_1 = A_1(w_1) \oplus B_1(\sigma_1),$$

wherein $\oplus$ is an operator, $A_0$, $B_0$, $A_1$, and $B_1$ are linear operators, and an operators E that maps $(u, v)$ to $(A_0(u) \oplus B_0(v), A_1(u) \oplus B_1(v))$ is invertible with respect to u, and $\sigma_0$ and $\sigma_1$ are state variables for providing redundancy to the obfuscated representations; and determining an obfuscated representation $(X_2, Y_2)$ of a third data $w_2$, wherein $w_2 = w_0 \otimes w_1$, wherein $\otimes$ is an operator, by performing the following operations on the obfuscated representation $(X_0, Y_0)$ of the first data value $w_0$ and the obfuscated representation $(X_1, Y_1)$ of the second data value $w_1$:

$$X_2 = X_0 \oplus X_1$$

$$Y_2 = Y_0 \oplus Y_1.$$

In another aspect, a computer program product is provided that comprises instructions for causing a processor system to perform the method set forth.

It will be appreciated by those skilled in the art that two or more of the above-mentioned embodiments, implementations, and/or aspects of the invention may be combined in any way deemed useful.

Modifications and variations of the image acquisition apparatus, the workstation, the system, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

In many applications, it is necessary to apply in a secure way an operation to a first input data value $w_0$ and a second input data value $w_1$, wherein a first obfuscated representation $Z_0$ of the first input data value $w_0$ and a second obfuscated representation $Z_1$ of the second input data value $w_1$ are available. It would be desirable to hide the first input data value $w_0$ and the second input data value $w_1$ from a malicious user, even if the malicious user has full access to the device, including access to the working memory, or even if the malicious user has capability to use debugging tools to analyze the application.

Therefore, instead of computing the values $w_0$ and $w_1$ and performing the operation, the operation may be performed using the first obfuscated representation $Z_0$ of the first input data value $w_0$ and the second obfuscated representation $Z_1$ of the second input data value $w_1$.

It is noted that that $Z_0$ and $Z_1$ may be divided into two components, so that $Z_0=(X_0, Y_0)$, and $Z_1=(X_1, Y_1)$.

Figure 1:
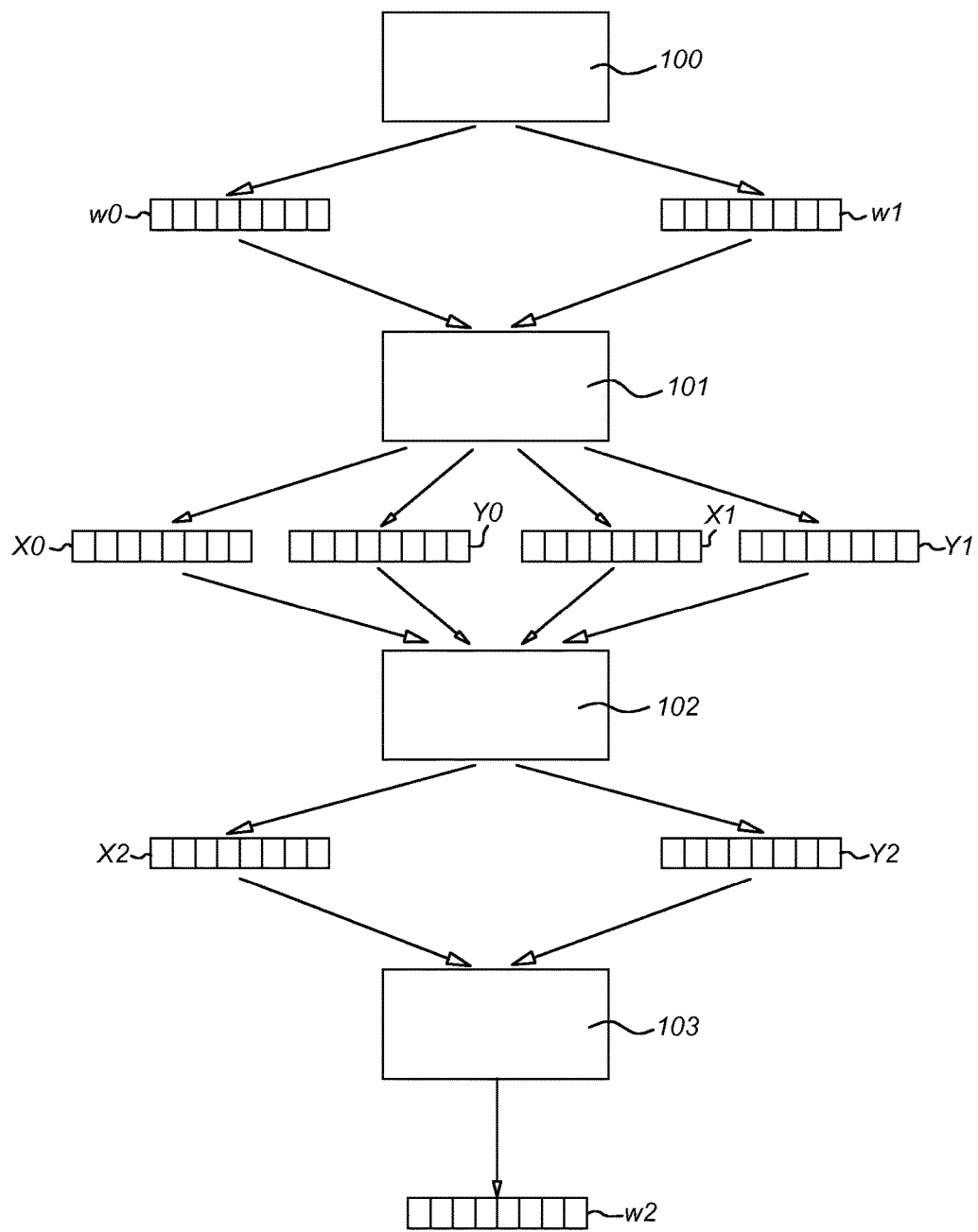
FIG. 1 is a block diagram of a system for securely performing an operation using obfuscated representations of the input data values.

FIG. 1 illustrates an embodiment of a system for performing a secure operation. In the illustrations, several processing means have been denoted by rectangles.

Moreover, data elements have been indicated by their variable symbol and a sketched array symbolizing a bit sequence of a given length. However, the actual length of the bit sequence of each data element may be varied. The drawings do not indicate the actual length of the data elements. The system may be implemented on a single processing device, such as a properly programmed computer, a smartphone, or a smartcard. The system may also be distributed over several different processing devices.

The system comprises an obtaining means for obtaining a first obfuscated representation $(X_0, Y_0)$ of the first input data value $w_0$ and a second obfuscated representation $(X_1, Y_1)$ of the second input data value $w_1$ wherein the following equations hold:

$$X_0 = A_0(w_0) \oplus B_0(\sigma_0)$$

$$Y_0 = A_1(w_0) \oplus B_1(\sigma_0)$$

$$X_1 = A_0(w_1) \oplus B_0(\sigma_1)$$

$$Y_1 = A_1(w_1) \oplus B_1(\sigma_1),$$

wherein $\oplus$ is an operator, $A_0$, $B_0$, $A_1$, and $B_1$ are linear operators, the operator $E$ that maps $(u, v) \mapsto (A_0(u) \oplus B_0(v), A_1(u) \oplus B_1(v))$ is invertible with respect to u, and $\sigma_0$ and $\sigma_1$ are state variables for providing redundancy to the obfuscated representations. The operators $\oplus$ and $\otimes$ could be a bitwise XOR operation. Alternatively, the operators could arithmetic additions defined on a given domain.

It is noted that there may be domains W, $\Sigma$ and Z defined such that $X_0$, $Y_0$, $X_1$, and $Y_1$ are elements of Z; $w_0$ and $w_1$ are elements of W, and $\sigma_0$ and $\sigma_1$ are elements of $\Sigma$, and $A_0: W \times W \to Z$, $A_1: W \times W \to Z$, $B_0: \Sigma \times \Sigma \to Z$, $B_1: \Sigma \times \Sigma \to Z$. Operator $\oplus$ is defined on Z, operator $\otimes$ is defined on W, and an operator $\Delta$ is defined on $\Sigma$. The operators $A_0$, $B_0$, $A_1$, and $B_1$ are linear operators. This means that, for example, $A_0(w_0 \otimes w_1) = A_0(w_0) \oplus A_0(w_1)$ for all $w_0$ and $w_1$ in W; $A(w_0 \otimes w_1) = A_1(w_0) \oplus A_1(w_1)$ for all $w_0$ and $w_1$ in W; $B_0(\sigma_0 \Delta \sigma_1) = B_0(\sigma_0) \oplus B_0(\sigma_1)$; and $B_1(\sigma_0 \Delta \sigma_1) = B_1(\sigma_0) \oplus B_1(\sigma_1)$.

The operation $\oplus$ is commutative (that is, $z_1 \oplus z_2 = z_2 \oplus z_1$ for all $z_1, z_2 \in Z$) and associative, that is, $(z_1 \oplus z_2) \oplus z_3 = z_1 \oplus (z_2 \oplus z_3)$ for all $z_1, z_2, z_3 \in \Sigma$.

The mappings $A_0$, $A_1$ from W to Z are such that for all $w_0, w_1 \in W$ and $i=0, 1$, $$A_i(w_0 \Delta w_1) = A_i(w_0) \oplus A_i(w_1)$$

The mappings $B_0$, $B_1$ from $\Sigma$ to Z are such that for all $\sigma_0, \sigma_1 \in \Sigma$ and $i=0, 1$, $$B_i(\sigma_0 \otimes \sigma_1) = B_i(\sigma_0) \oplus B_i(\sigma_1).$$

Finally, it should be feasible to determine $w \in W$ from $A_0(w) \oplus B_0(\sigma)$ and $A_1(w) \oplus B_1(\sigma)$. That is, if w, $w' \in W$ and $\sigma$, $\sigma' \in \Sigma$ are such that $A_i(w) \oplus B_i(\sigma) = A_i(w') \oplus B_i(\sigma')$ for i=1, 2, then w=w'. For example, the mapping $E: W \times \Sigma \to Z \times Z$ with $E:(w,\sigma) \mapsto (A_0(w) \oplus B_0(\sigma), A_1(w) \oplus B_1(\sigma))$ is invertible. In general, from given X, $Y \in Z$ and $\sigma \in \Sigma$, it should be possible to obtain w.

Now, a specific example will be discussed to illustrate this principle. Note that the selected sets and operations may be chosen differently and in a more complex way to obfuscate the data values better. In this example, $W=\{0,1\}^3$, $\Sigma=\{0,1\}^2$, and $Z=\{0,1\}^2$. In other words, W is the set of all three-bit values, E is the set of all two-bit values, and Z is the set of all two-bit values. The operators $\oplus$, $\otimes$, and $\Delta$ are the bitwise XOR operators on their respective domains. The linear operators of this example are defined as follows on their respective domains:

$$A_0(w_1, w_2, w_3) = (w_1, w_3)$$

$$B_0(\sigma_1, \sigma_2) = (0, \sigma_1)$$

$$A_1(w_1, w_2, w_3) = (0, w_2)$$

$$B_1(\sigma_1, \sigma_2) = (\sigma_1, 0).$$

The obfuscated representation $(X, Y) = ((x_1, x_2), (y_1, y_2))$ of a value $w = (w_1, w_2, w_3)$ with state parameter $\sigma = (\sigma_1, \sigma_2)$ can then be computed as follows:

$$X = (x_1, x_2) = A_0(w_1, w_2, w_3) + B_0(\sigma_1, \sigma_2) = (w_1, w_3) + (0, \sigma_1) = (w_1 + 0, w_3 + \sigma_1) = (w_1, w_3 + \sigma_1);$$

$$Y = (y_1, y_2) = A_1(w_1, w_2, w_3) + B_1(\sigma_1, \sigma_2) = (0, w_2) + (\sigma_1, 0) = (0 + \sigma_1, w_2 + 0) = (\sigma_1, w_2).$$

Note that, as needed to de-obfuscate the data, each value of $((x_1, x_2), (y_1, y_2))$ uniquely defines a value of $(w_1, w_2, w_3)$, because from any given $((x_1, x_2), (y_1, y_2))$ and $(\sigma_1, \sigma_2)$, it is possible to uniquely determine $(w_1, w_2, w_3)$, because $A_1(w_1, w_2, w_3) + B_1(\sigma_1, \sigma_2) = (\sigma_1, x_2)$ and $A_0(x_1, x_2, x_3) + B_0(\sigma_1, \sigma_2) = (x_1, \sigma_1 + x_2)$.

In this specific example, the value of $(\sigma_1, \sigma_2)$ is not uniquely defined by a value of $((x_1, x_2), (y_1, y_2))$. However, it is not necessary to be able to recover the value of $(\sigma_1, \sigma_2)$, because the data of interest is embodied by $(w_1, w_2, w_3)$.

Another simplified example is presented in the following. In this case, W, $\Sigma$, Z are equal to the set of positive real numbers. Operators $\Delta$ and $\oplus$, are the real multiplication, and operator $\otimes$ is the real addition. Moreover, the linear operators are selected as follows: $A_0(w)=w$, $A_1(w)=w^2$, $B_0(\sigma)=B_1(\sigma)=e^\sigma$. In this case also, w can be recovered from given (X, Y) and $\sigma$. Indeed, from $A_0(w) \oplus B_0(\sigma) = we^\sigma$ and $A_1(w) \oplus B_1(\sigma) = w^2 e^\sigma$, w can be obtained by performing a division.

In the following, the operator is indicated by $\oplus$ on all domains W, $\Sigma$ and Z. However, it should be kept in mind that in principle, the operators on W, $\Sigma$ and Z can all be different operators. Alternatively, for example if $W=\Sigma=Z$, the same operator may be used on each domain.

In a specific example, $w_0$, $\sigma_0$, $X_0$, $Y_0$, $w_1$, $\sigma_1$, $X_1$, and $Y_1$ all are data values having the same number of bits. For instance, $w_0$, $\sigma_0$, $X_0$, $Y_0$, $w_1$, $\sigma_1$, $X_1$, and $Y_1$ may have 8 bits, or may have a number of bits which is multiple of 2, in order to implement the system in a more efficient way.

In a specific example, at least one of $A_0$, $B_0$, $A_1$, and $B_1$ is an invertible linear operator. In a more specific example, each of $A_0$, $B_0$, $A_1$, and $B_1$ is an invertible linear operator.

The system may comprise a data input unit 100 for determining a first input data value $w_0$ and a second input data value $w_1$. For example, the input unit 100 is configured to receive the first input data value $w_0$ and the second input data value $w_1$ via a communications subsystem of the device. Alternatively, the input unit 100 may be configured to receive the input data values from a memory, which may be an internal memory or an external memory.

For example, the obtaining means may comprise an obfuscating means 101 configured to receive the first data value $w_0$ and the second data value $w_1$ as input values from data input unit 100, and generate the first obfuscated representation $(X_0, Y_0)$ based on the first input data value $w_0$ and the second obfuscated representation $(X_1, Y_1)$ based on the second input data value $w_1$. For example, a relationship between obfuscated representations and data values may be pre-computed and stored in a look-up table. Optionally, the obfuscating means 101 comprises a state generator for generating a value of the state variable $\sigma_0$ and/or a value of the state variable $\sigma_1$. These values may be generated, for example, randomly or pseudo-randomly. For example, these values may depend on $w_0$ and $w_1$, respectively. The obfuscating means 101 may be configured to generate the first obfuscated representation $(X_0, Y_0)$ based on the first data value $w_0$ and the state variable $\sigma_0$, and to generate the second obfuscated representation $(X_1, Y_1)$ based on the second data value $w_1$ and the state variable $\sigma_1$. In this case, for example, a relationship between obfuscated representations and pairs of data values and state values may be pre-computed and stored in a look-up table.

Alternatively, the obtaining means is configured to obtain the first obfuscated representation $(X_0, Y_0)$ and the second obfuscated representation $(X_1, Y_1)$ in a different way. For example, these values may be received from an external source, or may be the result of computations on obfuscated representations of other data.

The system further comprises a determining means 102. The determining means 102 is configured to determine the obfuscated representation $(X_2, Y_2)$ of a data value $w_2$, wherein $w_2 = w_0 \oplus w_1$. More specifically, the determining means 102 computes:

$$x_2 = X_0 \oplus X_1$$

$$Y_2 = Y_0 \oplus Y_1.$$

In a particular example, these operations $\oplus$ are computed in the clear. For example, in case $\oplus$ is the XOR operation, that operation may be performed using a corresponding XOR machine instruction of a processor of a device on which the system is implemented.

Due to a commutative and associative properties of the operator $\oplus$ and the linearity of the several operators, it holds that:

$$X_2 = X_0 \oplus X_1 = A_0(w_0) \oplus B_0(\sigma_0) \oplus A_0(w_1) \oplus B_0(\sigma_1) = A_0(w_0) \oplus A_0(w_1) \oplus B_0(\sigma_0) \oplus B_0(\sigma_1) = A_0(w_0 \oplus w_1) \oplus B_0(\sigma_0 \oplus \sigma_1)$$

$$Y_2 = Y_0 \oplus Y_1 = A_1(w_0) \oplus B_1(\sigma_0) \oplus A_1(w_1) \oplus B_1(\sigma_1) = A_1(w_0) \oplus A_1(w_1) \oplus B_1(\sigma_0) \oplus B_1(\sigma_1) = A_1(w_0 \oplus w_1) \oplus B_1(\sigma_0 \oplus \sigma_1)$$

In view of this, $(X_2, Y_2)$ is the obfuscated representation of $(w_0 \oplus w_1, \sigma_0 \oplus \sigma_1)$. As it was defined before, $w_2 = w_0 \oplus w_1$. When it is defined that $\sigma_2 = \sigma_0 \oplus \sigma_1$, we have that $(X_2, Y_2)$ is the obfuscated representation of $w_2$, with $\sigma_2$ as the state variable.

It is noted that the obfuscating means 101 may be implemented by means of look-up tables. For example, the obfuscating means 101 may be implemented by a single look-up table. Optionally, these look-up tables may be obfuscated further by encoding the inputs and outputs of the look-up tables using techniques known from e.g. Chow et al.

The obfuscated value $(X_2, Y_2)$ may optionally be subject to further obfuscated processing, for example by performing additional $\oplus$ operations, or other kinds of operations, before being de-obfuscated. When it is time to recover the data value represented by any obtained obfuscated value, the obfuscated value may be provided to de-obfuscating means for de-obfuscating. Accordingly, the system may further comprise de-obfuscating means 103. The de-obfuscating means 103 may receive the obfuscated representation $(X_2, Y_2)$ of the data value $w_2$ and may de-obfuscate the obfuscated representation $(X_2, Y_2)$ of the data value $w_2$ in order to obtain $w_2$ by solving the above-mentioned system of equation:

$$X_2 = A_0(w_2) \oplus B_0(\sigma_2)$$

$$Y_2 = A_1(w_2) \oplus B_1(\sigma_2),$$

wherein $\sigma_2$ is a state variable that provides redundancy to the obfuscated representation $(X_2, Y_2)$.

The system may further comprise an output unit configured to receive the computed value of $w_2$ from the de-obfuscating means 103 and forward the value of $w_2$ to other components of the system (not shown), and/or store the value of $w_2$ in a memory. For example, the output unit may be configured to display a visualization of the data $w_2$ on a display device and/or reproduce the data on an audio device.

The input means 100 and/or the obfuscating means 101 may be part of a first device, and the determining means 102 may be part of a second device, wherein the first device is a different device from the second device. For instance, the input means 100 may receive the first input data value $w_0$ and the second input data value $w_1$ from memory or from an external source and provide them to the obfuscating means 101, which calculates the first obfuscated representation $(X_0, Y_0)$ of the first input data value $w_0$ and the second obfuscated representation $(X_1, Y_1)$ of the second input data value $w_1$. The first device may comprise transmitter means. The transmitter means may transmit the obfuscated representation $(X_0, Y_0)$ of the first input data value $w_0$ and the second obfuscated representation $(X_1, Y_1)$ of the second input data value $w_1$ to the second device. The second device may comprise receiving means. The receiving means may receive the obfuscated representation $(X_0, Y_0)$ of the first input data value $w_0$ and the second obfuscated representation $(X_1, Y_1)$ of the second input data value $w_1$ from the first device, and provide them to the determining means 102. The determining means 102 may determine the obfuscated representation $(X_2, Y_2)$ of a data value $w_2$, wherein $w_2 = w_0 \oplus w_1$, in the way set forth hereinabove. The de-obfuscating means 103 (and the optional output unit) may be part of the first device, or they may be part of the second device, or they may be part of a further, third device. Accordingly, the second device may comprise a transmitter configured to transmit the obfuscated representation $(X_2, Y_2)$ to the first or third device.

Figure 2:
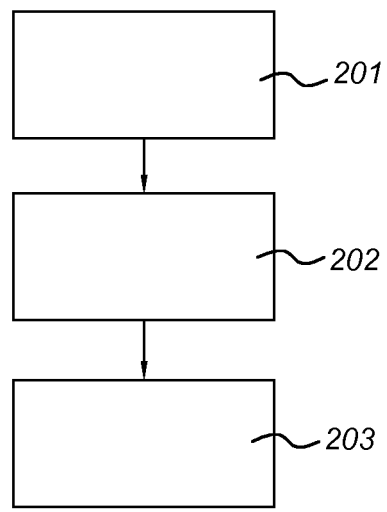
FIG. 2 is a diagram illustrating a method of security performing an operation using obfuscated representations of the input data values.

FIG. 2 illustrates a method of security performing an operation using obfuscated representations of input data values.

The method comprises a step 201 of obfuscating a first input data value $w_0$ and a second input data value $w_1$ to generate a first obfuscated representation $(X_0, Y_0)$ of the first input data value $w_0$ and a second obfuscated representation $(X_1, Y_1)$ of the second input data value $w_1$. The first obfuscated representation $(X_0, Y_0)$ of the first input data value $w_0$ and/or the second obfuscated representation $(X_1,$ $Y_1$) of the second input data value $w_1$ may be generated by computing the following equations:

$$X_0 = A_0(w_0) \oplus B_0(\sigma_0)$$

$$Y_0 = A_1(w_0) \oplus B_1(\sigma_0)$$

$$X_1 = A_0(w_1) \oplus B_0(\sigma_1)$$

$$Y_1 = A_1(w_1) \oplus B_1(\sigma_1)$$

The first obfuscated representation $(X_0, Y_0)$ of the first input data value $w_0$ and/or the second obfuscated representation $(X_1, Y_1)$ of the second input data value $w_1$ may be generated by looking up in a look-up table. The look-up table may define a relation between an obfuscated representation $(X_3, Y_3)$ of a data value $w_3$ and the obfuscated representation $(X_0, Y_0)$ of the first input data value $w_0$.

The method may further comprise a step 202 of determining an obfuscated representation $(X_2, Y_2)$ of a third data $w_2$, wherein $w_2 = w_0 \oplus w_1$. The obfuscated representation $(X_2, Y_2)$ of the third data $w_2$ may be determined by performing the following operation:

$$X_2 = X_0 \oplus X_1$$

$$Y_2 = Y_0 \oplus Y_1$$

Wherein $(X_0, Y_0)$ may be the first obfuscated representation of the first input data value $w_0$ and $(X_1, Y_1)$ may be the second obfuscated representation of the second input data value $w_1$.

The method may further comprise a step 203 of sending the determined obfuscated representation $(X_2, Y_2)$ of the third data $w_2$ for further processing (for instance, for performing a new operation), or for storing in a look-up table, wherein the look-up table may be used later for generating obfuscated representations.

Figure 3:
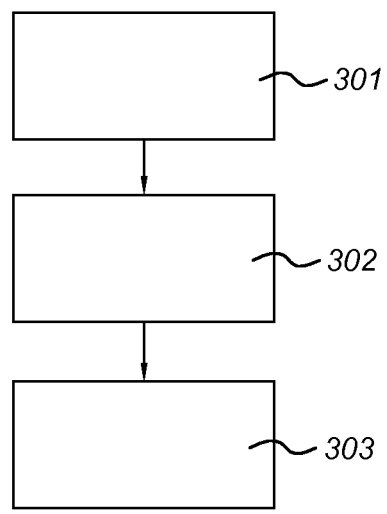
FIG. 3 is a diagram illustrating a method of de-obfuscating a data after security performing an operation using obfuscated representations of the input data values.

FIG. 3 illustrates a method in which obfuscated data is de-obfuscated after performing an operation using obfuscated representations of input data values.

The method may comprise a step 301 of receiving a first obfuscated representation $(X_0, Y_0)$ of the first input data value $w_0$ and a second obfuscated representation $(X_1, Y_1)$ of the second input data value $w_1$. The first obfuscated representation $(X_0, Y_0)$ of the first input data value $w_0$ and/or the second obfuscated representation $(X_1, Y_1)$ of the second input data value $w_1$ may have been generated by computing the following equations:

$$X_0 = A_0(w_0) \oplus B_0(\sigma_0)$$

$$Y_0 = A_1(w_0) \oplus B_1(\sigma_0)$$

$$X_1 = A_0(w_1) \oplus B_0(\sigma_1)$$

$$Y_1 = A_1(w_1) \oplus B_1(\sigma_1)$$

The first obfuscated representation $(X_0, Y_0)$ of the first input data value $w_0$ and/or the second obfuscated representation $(X_1, Y_1)$ of the second input data value $w_1$ may have been generated using a look-up table. The look-up table may define a relation between an obfuscated representation $(X_3, Y_3)$ of a data value $w_3$ and the obfuscated representation $(X_0, Y_0)$ of the first input data value $w_0$.

The method may further comprise a step 302 of determining an obfuscated representation $(X_2, Y_2)$ of a third data $w_2$, wherein $w_2 = w_0 \oplus w_1$. The obfuscated representation $(X_2, Y_2)$ of the third data $w_2$ may be determined by performing the following operation:

$$X_2 = X_0 \oplus X_1$$

$$Y_2 = Y_0 \oplus Y_1$$

Wherein $(X_0, Y_0)$ may be the first obfuscated representation of the first input data value $w_0$ and $(X_1, Y_1)$ may be the second obfuscated representation of the second input data value $w_1$.

The method may further comprise a step 303 of de-obfuscating the determined obfuscated representation $(X_2, Y_2)$ of the third data $w_2$ in order to obtain $w_2$. The de-obfuscating may be performed by solving the system of equations:

$$X_2 = A_0(w_2) \oplus B_0(\sigma_2)$$

$$Y_2 = A_1(w_2) \oplus B_1(\sigma_2),$$

wherein $\oplus$ is an operator, $A_0$, $B_0$, $A_1$, and $B_1$ are operators that are linear with respect to the operator $\oplus$, and the operator E that maps $(u, v)$ to $(A_0(u) \oplus B_0(v), A_1(u) \oplus B_1(v))$ is invertible with respect to u and $\sigma_2$ is a state variable for providing redundancy to the obfuscated representation.

The de-obfuscated value $w_2$ may be sent to another unit for further processing (for instance, for performing a new operation, or for displaying purposes), or for storing in a look-up table, wherein the look-up table may be used later for de-obfuscating obfuscated representations.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for performing an operation on data using obfuscated representations of the data, comprising:
an input device configured to (i) obtain a first obfuscated representation $(X_0, Y_0)$ of a first data value $w_0$ and (ii) obtain a second obfuscated representation $(X_1, Y_1)$ of a second data value $w_1$, wherein the following relations hold:

$$X_0 = A_0(w_0) \oplus B_0(\sigma_0)$$

$$Y_0 = A_1(w_0) \oplus B_1(\sigma_0)$$

$$X_1 = A_0(w_1) \oplus B_0(\sigma_1)$$

$$Y_1 = A_1(w_1) \oplus B_1(\sigma_1)$$

wherein
$\oplus$ is an operator,
$A_0$ and $A_1$ are linear operators dependent on a data value $(w_0, w_1)$,
$B_0$ and $B_1$ are linear operators dependent on a state variable $(\sigma_0, \sigma_1)$, and
an operator E that maps $(u, v)$ to $(A_0(u) \oplus B_0(v), A_1(u) \oplus B_1(v))$, is invertible with respect to u, and
$\sigma_0$ and $\sigma_1$ are state variables that provide redundancy to the obfuscated representations; and
a first processor configured to determine an obfuscated representation $(X_2, Y_2)$ of a third data value $w_2$, wherein $w_2 = w_0 \otimes w_1$, wherein $\otimes$ is an operator, by performing operations on the obfuscated representation $(X_0, Y_0)$ of the first data value $w_0$ and the obfuscated representation $(X_1, Y_1)$ of the second data value $w_1$ that comprise:

$$X_2 = X_0 \oplus X_1$$

$$Y_2 = Y_0 \oplus Y_1, \text{ and}$$

a transmitter, coupled to the first processor, configured to transmit the obfuscated representation $(X_2, Y_2)$ of the third data value $w_2$ to a receiver of a second device.

2. The system of claim 1, further comprising a second processor, coupled to the input device, configured to generate (i) the first obfuscated representation $(X_0, Y_0)$ based on the first data value $w_0$ and (ii) the second obfuscated representation $(X_1, Y_1)$ based on the second data value $w_1$.

3. The system of claim 1, further comprising:
a processor of the second device, coupled to the receiver of the second device, configured to de-obfuscate the obfuscated representation $(X_2, Y_2)$ of the third data value $w_2$ in order to obtain the third data value $w_2$ using a system of equations that comprise:

$$X_2 = A_0(w_2) \oplus B_0(\sigma_2)$$

$$Y_2 = A_1(w_2) \oplus B_1(\sigma_2),$$

wherein
$\sigma_2$ is a state variable for providing redundancy to the obfuscated representation $(X_2, Y_2)$ of the third data value $w_2$.

4. The system of claim 2, further comprising:
a third processor configured to generate a value of the state variable $\sigma_0$ and a value of the state variable $\sigma_1$, and wherein the second processor is further configured to generate (i) the first obfuscated representation $(X_0, Y_0)$ based on the first data value $w_0$ and the state variable $\sigma_0$, and (ii) the second obfuscated representation $(X_1, Y_1)$ based on the second data value $w_1$ and the state variable $\sigma_1$.

5. The system of claim 2, wherein the second processor is configured to look up the first obfuscated representation $(X_0, Y_0)$ and the second obfuscated representation $(X_1, Y_1)$ in a look-up table.

6. The system of claim 1, wherein the first processor is configured to perform at least one of the computation of $X_2$ from $X_0$ and $X_1$ and the computation of $Y_2$ from $Y_0$ and $Y_1$ in the clear.

7. The system of claim 1, wherein $w_0, w_1, w_2, \sigma_0, \sigma_1, \sigma_2, X_0, X_1, X_2, Y_0, Y_1,$ and $Y_2$ are values having a same number of bits.

8. The system of claim 1, wherein at least one of the operators $A_0, B_0, A_1,$ and $B_1$ is an invertible operator.

9. The system of claim 8, wherein each one of the operators $A_0, B_0, A_1,$ and $B_1$ is an invertible operator.

10. The system of claim 1, wherein the operator $\oplus$ is a bitwise XOR operation and the operator $\otimes$ is a bitwise XOR operator.

11. The system of claim 10, wherein the bitwise XOR operation is performed by at least one XOR machine instruction.

12. A method for performing an operation on data using obfuscated representations of the data, comprising the steps of:
obtaining, via an input device, a first obfuscated representation $(X_0, Y_0)$ of a first data value $w_0$ and a second obfuscated representation $(X_1, Y_1)$ of a second data value $w_1$, wherein the following relations hold:

$$X_0 = A_0(w_0) \oplus B_0(\sigma_0)$$

$$Y_0 = A_1(w_0) \oplus B_1(\sigma_0)$$

$$X_1 = A_0(w_1) \oplus B_0(\sigma_1)$$

$$Y_1 = A_1(w_1) \oplus B_1(\sigma_1)$$

wherein
$\oplus$ is an operator, $A_0$ and $A_1$ are linear operators dependent on a data value $(w_0, w_1)$, $B_0$ and $B_1$ are linear operators dependent on a state variable $(\sigma_0, \sigma_1)$, and an operator E that maps $(u, v)$ to $(A_0(u) \oplus B_0(v), A_1(u) \oplus B_1(v))$ is invertible with respect to u, and
$\sigma_0$ and $\sigma_1$ are state variables for providing redundancy to the obfuscated representations;

determining, via a first processor, an obfuscated representation $(X_2, Y_2)$ of a third data $w_2$, wherein $w_2 = w_0 \otimes w_1$, wherein $\otimes$ is an operator, by performing operations on the obfuscated representation $(X_0, Y_0)$ of the first data value $w_0$ and the obfuscated representation $(X_1, Y_1)$ of the second data value $w_1$, that comprise:

$$X_2 = X_0 \oplus X_1$$

$$Y_2 = Y_0 \oplus Y_1, \text{ and}$$

transmitting, via a transmitter coupled to the first processor, the obfuscated representation $(X_2, Y_2)$ of the third data value $w_2$ to a receiver of a second device.

13. A non-transitory computer readable medium embodied with a computer program that comprises a set of instructions executable by a processor for causing the processor to execute a method for performing an operation on data using obfuscated representations of the data, comprising the steps of:

obtaining, via an input device, a first obfuscated representation $(X_0, Y_0)$ of a first data value $w_0$ and a second obfuscated representation $(X_1, Y_1)$ of a second data value $w_1$, wherein the following relations hold:

$$X_0 = A_0(w_0) \oplus B_0(\sigma_0)$$

$$Y_0 = A_1(w_0) \oplus B_1(\sigma_0)$$

$$X_1 = A_0(w_1) \oplus B_0(\sigma_1)$$

$$Y_1 = A_1(w_1) \oplus B_1(\sigma_1)$$

wherein
- $\oplus$ is an operator, $A_0$ and $A_1$ are linear operators dependent on a data value $(w_0, w_1)$, $B_0$ and $B_1$ are linear operators dependent on a state variable $(\sigma_0, \sigma_1)$, and an operator E that maps $(u, v)$ to $(A_0(u) \oplus B_0(v), A_1(u) \oplus B_1(v))$ is invertible with respect to u, and
- $\sigma_0$ and $\sigma_1$ are state variables for providing redundancy to the obfuscated representations;

determining, via a first processor, an obfuscated representation $(X_2, Y_2)$ of a third data $w_2$, wherein $w_2 = w_0 \otimes w_1$, wherein $\otimes$ is an operator, by performing operations on the obfuscated representation $(X_0, Y_0)$ of the first data value $w_0$ and the obfuscated representation $(X_1, Y_1)$ of the second data value $w_1$, that comprise:

$$X_2 = X_0 \oplus X_1$$

$$Y_2 = Y_0 \oplus Y_1, \text{ and}$$

transmitting, via a transmitter coupled to the first processor, the obfuscated representation $(X_2, Y_2)$ of the third data value $w_2$ to a receiver of a second device.

\* \* \* \* \*